(12) United States Patent
Williams

(10) Patent No.: US 11,332,360 B2
(45) Date of Patent: May 17, 2022

(54) GAS PUMP ALERT WARNING SYSTEM

(71) Applicant: Reese E. Williams, Pacifica, CA (US)

(72) Inventor: Reese E. Williams, Pacifica, CA (US)

( * ) Notice: Subject to any disclaimer, the term of this patent is extended or adjusted under 35 U.S.C. 154(b) by 259 days.

(21) Appl. No.: 16/823,750

(22) Filed: Mar. 19, 2020

(65) Prior Publication Data

US 2021/0294385 A1  Sep. 23, 2021

(51) Int. Cl.
| | | |
|---|---|---|
| *B67D 7/06* | (2010.01) | |
| *G06F 1/16* | (2006.01) | |
| *B60L 58/12* | (2019.01) | |
| *G08B 6/00* | (2006.01) | |
| *G08B 5/38* | (2006.01) | |
| *B67D 7/12* | (2010.01) | |

(52) U.S. Cl.
CPC .............. *B67D 7/067* (2013.01); *B60L 58/12* (2019.02); *B67D 7/12* (2013.01); *G06F 1/1658* (2013.01); *G08B 5/38* (2013.01); *G08B 6/00* (2013.01)

(58) Field of Classification Search
CPC .......... B67D 7/12; B67D 7/067; B67D 7/425; B67D 7/04–086; G08B 5/36; G08B 5/38
See application file for complete search history.

(56) References Cited

U.S. PATENT DOCUMENTS

| | | | |
|---|---|---|---|
| 6,237,647 B1* | 5/2001 | Pong ..................... | B67D 7/348 |
| | | | 141/94 |
| 10,577,238 B1* | 3/2020 | Chamoun ................ | B67D 7/04 |
| 2004/0260470 A1* | 12/2004 | Rast .................... | G06Q 10/0637 |
| | | | 705/337 |
| 2010/0018605 A1* | 1/2010 | Bentivoglio ............. | B67D 7/32 |
| | | | 141/198 |
| 2010/0265033 A1* | 10/2010 | Cheung ................. | G07F 13/025 |
| | | | 141/94 |
| 2019/0084822 A1* | 3/2019 | Bauck ................... | F16K 39/022 |

* cited by examiner

*Primary Examiner* — Andrew D St. Clair
(74) *Attorney, Agent, or Firm* — David R. Heckadon; Gordon Rees Scully Mansukhani LLP

(57) ABSTRACT

A system for warning that a fuel line nozzle should be removed from a gas tank, by: determining that a fuel pump nozzle has been tilted from its resting position in a pump cradle to a refueling position where it has been inserted into a gas tank tube; and then determining that fueling through the fuel line has stopped by detecting vibration of the fuel pump nozzle when the fuel line shuts off; and then activating an alert system including a warning light and an audible sound if the fuel pump nozzle has not been removed from the gas tank tube and returned to the pump cradle after a predetermined period of time. The system can also wirelessly transmit fuel line use data to a remote computer.

11 Claims, 8 Drawing Sheets

GAS PUMP ALERT WARNING SYSTEM

TECHNICAL FIELD

The present invention relates to gasoline pumps at gas stations.

BACKGROUND OF THE INVENTION

An increasingly common problem at gas stations is drivers pulling away from the pump when the fuel hose nozzle is still sitting in the gas tank. This occurs when customers forget to remove the gas pump from their tank and put the gas nozzle back in its cradle on the pump. By all accounts, this problem seems to be increasing and may, in part, be blamed on how distracted drivers become when on their phones (perhaps quickly catching up on texts and emails when stopped to pump gas). In addition, customers typically are required to pay before pumping their gas. As a result, customers are ready to leave the gas station at the moment they are done filling their car's gas tank.

To combat this problem (and to provide re-fueling safety in general), gas line break-away systems have been designed that permit the gas nozzle to snap off of the end of the fuel line. This break-away system prevents damage to the gas pump, and it also shuts off the gas flow such that flammable gasoline does not spill out next to the vehicle(s) at the gas station. This break-away system has mitigated some damage, however, it is still very expensive for the gas station owner, as the cost of equipment replacement may range from $175 to $3,500. All too often, the cost of equipment replacement is about equal to the insurance deductible that gas station owners pay to repair the damage of the broken pumps. As such, gas station owners typically must absorb the costs of this damage.

What would instead be desired is a system that prevents or reduces the number of these accidents in the first place.

A second problem common to gas station fuel pumps is that although gas stations are able to monitor pump usage, they are not able to monitor the duration and frequency of times that the pump nozzles are in use.

It would instead be desirable to provide a monitoring system that could track the use of the individual pump nozzles at the gas station, and then report this information conveniently back to the gas station operators. Preferably, this information could comprise both the frequency and duration of nozzle use. The use of this information may be helpful in predicting gas pump equipment maintenance or repair. In addition, for older gas pumps that have dedicated nozzles for each octane blend (i.e.: pumps that have three individual fuel lines and nozzles corresponding to the standard three different octane level gasoline blends), it would be desirable to individually monitor which of the three fuel lines are actually being used, and at what times, and for what duration of time.

SUMMARY OF THE INVENTION

In preferred aspects, the present system provides a warning system signaling a person that they have left the fuel nozzle of a gas pump in their car if the gas nozzle has not been placed back into the cradle in the pump after a pre-determined period of time after the refueling has stopped. In preferred aspects, warning lights may flash or an audible warning sound may be activated (or both) to alert the driver that the nozzle of the gas pump is still inserted into their car's gas tank. As such, the present invention prevents distracted drivers from pulling out of gas stations with the gas fuel line nozzle still inserted into their car.

In one preferred aspect, the present system comprises a monitoring system for a fuel line, comprising: a housing dimensioned to be mounted at a distal end of a fuel line; a tilt sensing mechanism in the housing; a vibration sensing mechanism in the housing; a microcontroller in the housing, wherein the microcontroller is configured to: (a) receive data from the tilt sensor to detect tilting of the housing, and (b) receive data from the vibration sensor to detect vibration of the housing; and an alert system comprising at least one warning light or at least one speaker mounted on the housing. In one embodiment, the tilt sensing mechanism is a mechanical tilt sensor and the vibration sensing mechanism is a vibration sensor. In alternate embodiments, both of the tilt sensing and vibration sensing functions can be performed by an accelerometer(s). In those embodiments where the tilt and/or vibration sensing mechanisms require power to operate, power can be provided by a power supply in the housing for powering the tilt sensor and the vibration sensor (or the accelerometer(s)). This power supply in the housing preferably also powers the microcontroller and the alert system.

Preferably, the housing is dimensioned to be mounted adjacent to a fuel nozzle, for example, next to the swivel connection at the distal end of the fuel line. This alert system is preferably activated by the microcontroller when the microcontroller has determined that the housing has initially been tilted by a predetermined angle (for example, when the nozzle has been moved from the pump cradle and placed into the gas tank inlet). The alert system is also preferably activated by the microcontroller when the microcontroller has determined that the housing has remained tilted by a predetermined angle for a predetermined period of time after the vibration sensing mechanism has detected vibration of the housing (for example, after the vehicle's refueling has stopped and the gas line has automatically shut off). In further preferred aspects, the alert system is repeatedly activated at predetermined intervals of time when the microcontroller has determined that the housing has not been tilted after a predetermined period of time after the vibration sensing mechanism has detected vibration of the housing (for example, as a repeating alert when the driver has failed to take the nozzle out of the gas tank inlet and return it to the pump cradle after a predetermined period of time).

A primary advantage of the present system is that it warns drivers that they haven't taken the fuel pump nozzle out of their car after refueling. Another advantage of the present system is that it is independent from, and requires no integration to any of the circuitry of the gas pump. Preferably as well, its electronics are entirely disposed within the housing such that no possibility exists for its electronics or power supply producing a spark near the fuel line. As such, another advantage of the present system is that it is completely safe.

In various additional aspects, the present system can also be used to track the number of times (and their duration) a particular fuel pump line has been used. Optionally, this data can be logged by the present system and wirelessly transmitted to a remote location or computer which then tracks individual gas line gas pump activity. As such, for older pumps where three separate nozzles are provided corresponding to the three octane blends, the gas station operator can measure and track the use of each of the three individual nozzles associated with the standard 87, 90 and 92 blend gasoline fuel lines for each gas pump. One advantage of this use of the present system is that it can predict maintenance and repairs. In contrast, standard gas pumps typically only track overall operation of the pump itself (and do not track when the pump nozzle has been moved, and for how long).

In these preferred aspects, present system comprises a data recording system in the microprocessor, wherein the data recording system logs information from the tilt sensor to record the number of times (and their duration) that the housing has been tilted and then returned to an original position; and a data transmission system for transmitting the information logged by the data recording system.

It is further to be understood that the present system can be used only as a refueling warning system, or as a fuel line use monitoring system, or both simultaneously, all keeping within the scope of the present invention.

DETAILED DESCRIPTION OF THE DRAWINGS

Figure 1:
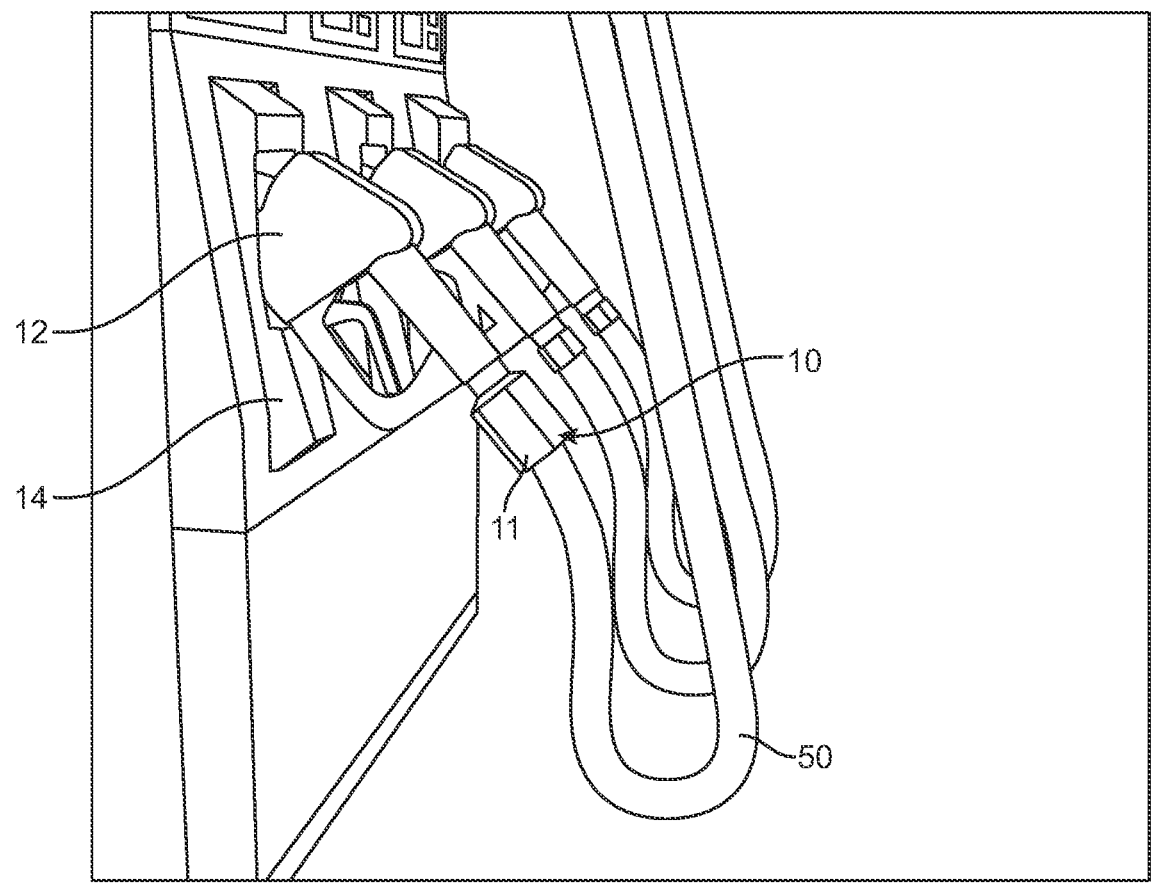
FIG. 1 is a perspective view of an embodiment of the present warning system attached to one of three standard gas pump lines at a gas station.
Figure 2:
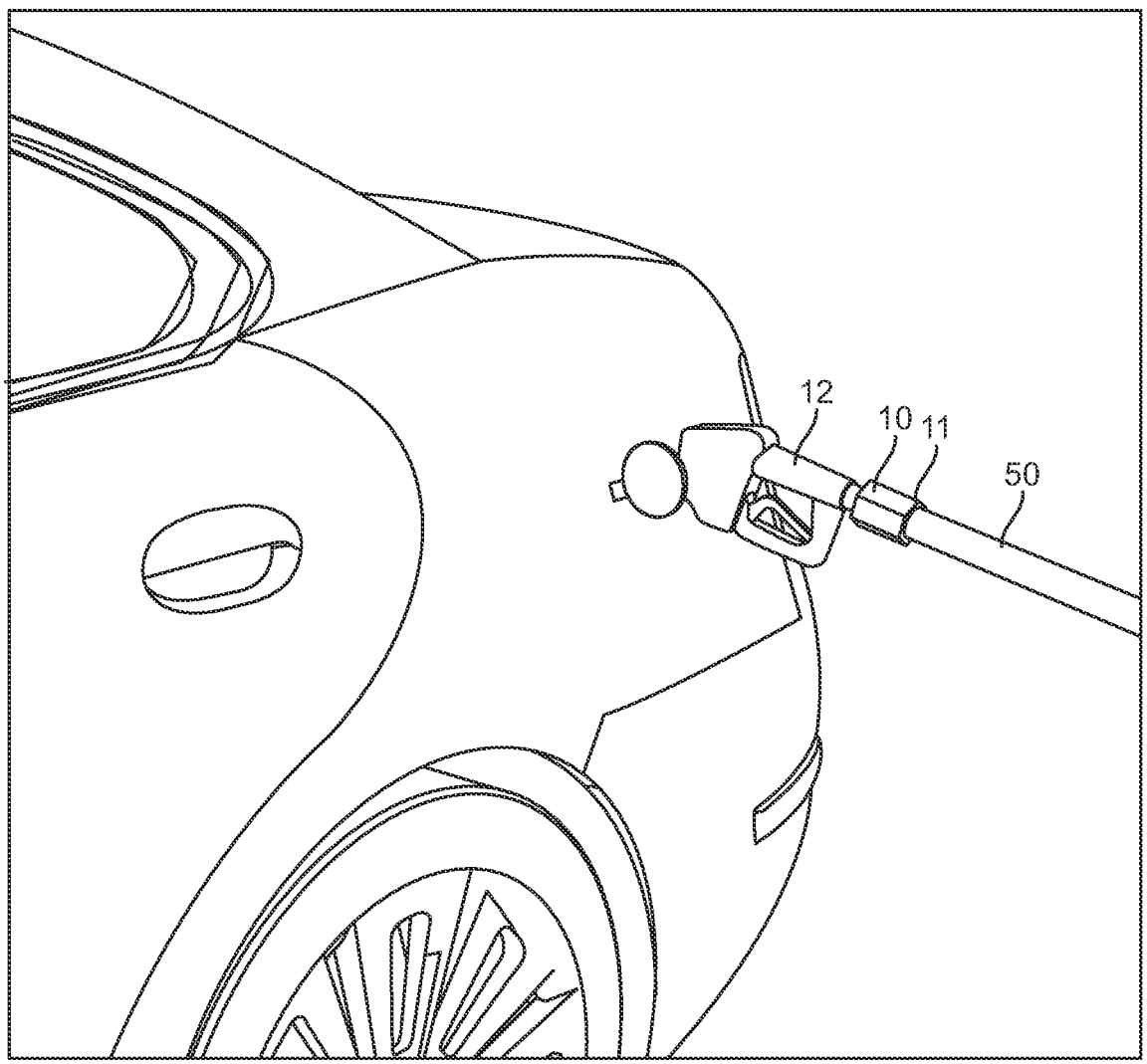
FIG. 2 is a perspective view of the warning system of FIG. 1 after the gas pump has been inserted into the inlet to the vehicle's gas tank.
Figure 3:
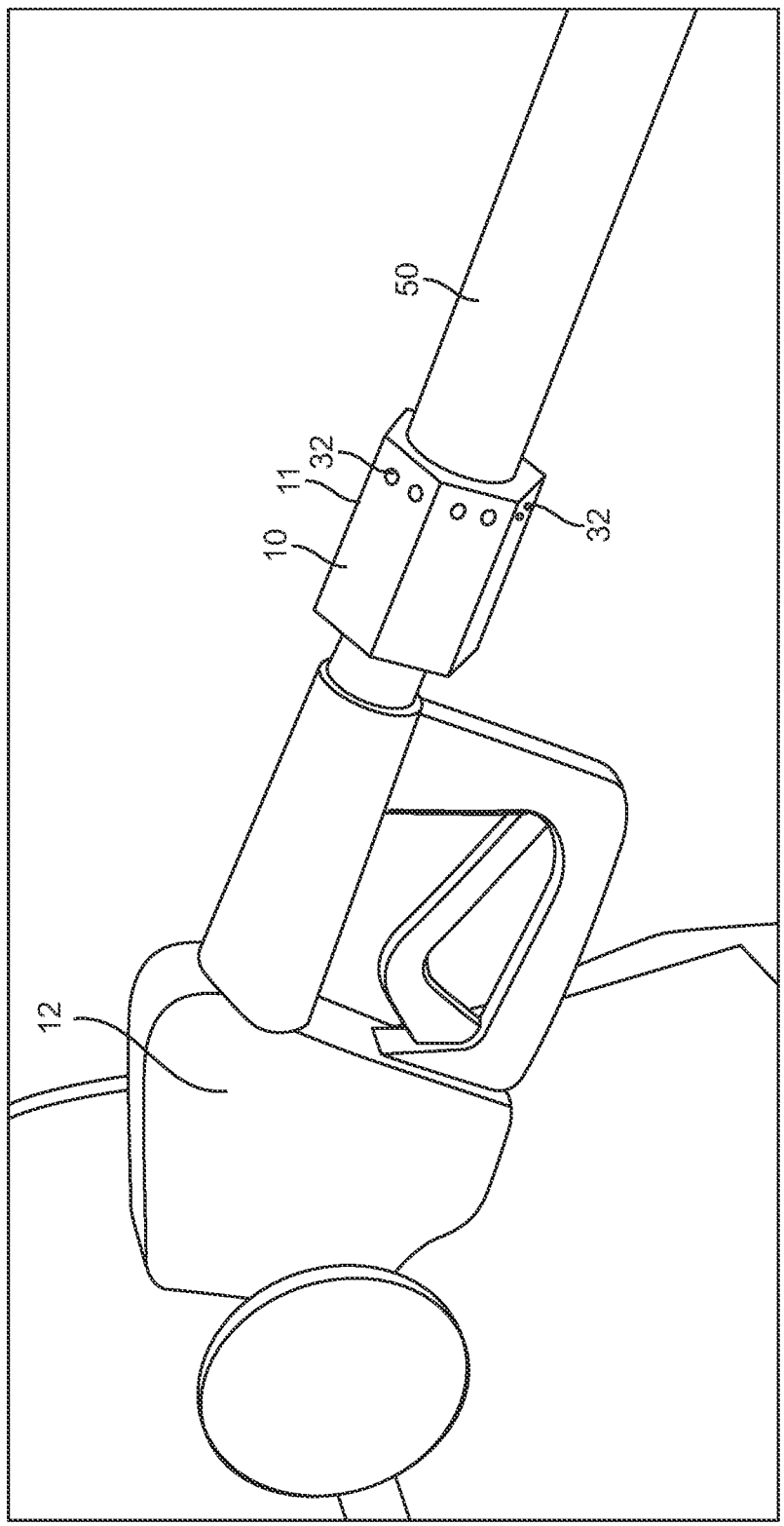
FIG. 3 is a close-up corresponding to FIG. 2, showing warning lights on the present warning system.
Figure 4:
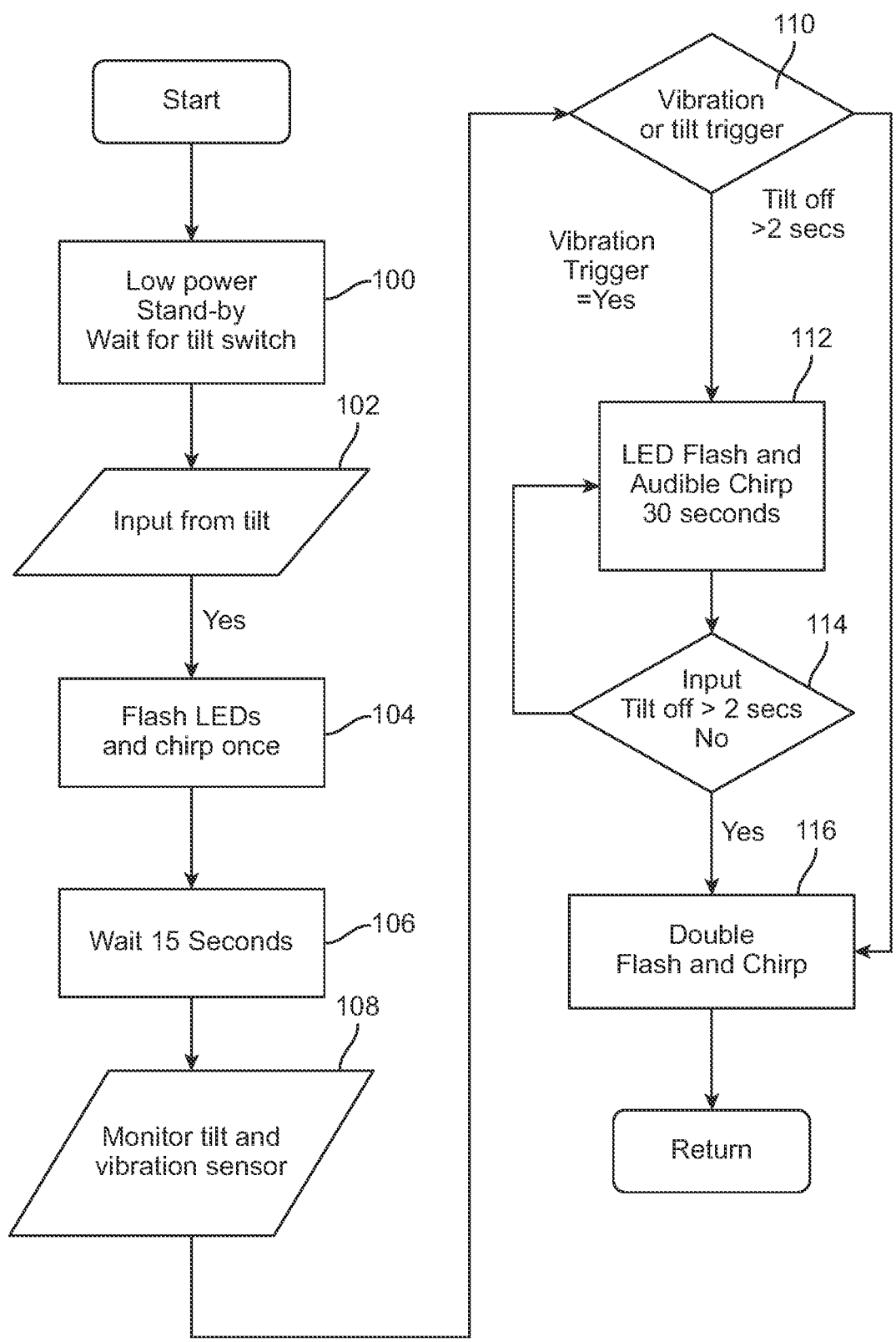
FIG. 4 is a flow charts illustrating steps in the operation of the present warning system.
Figure 5:
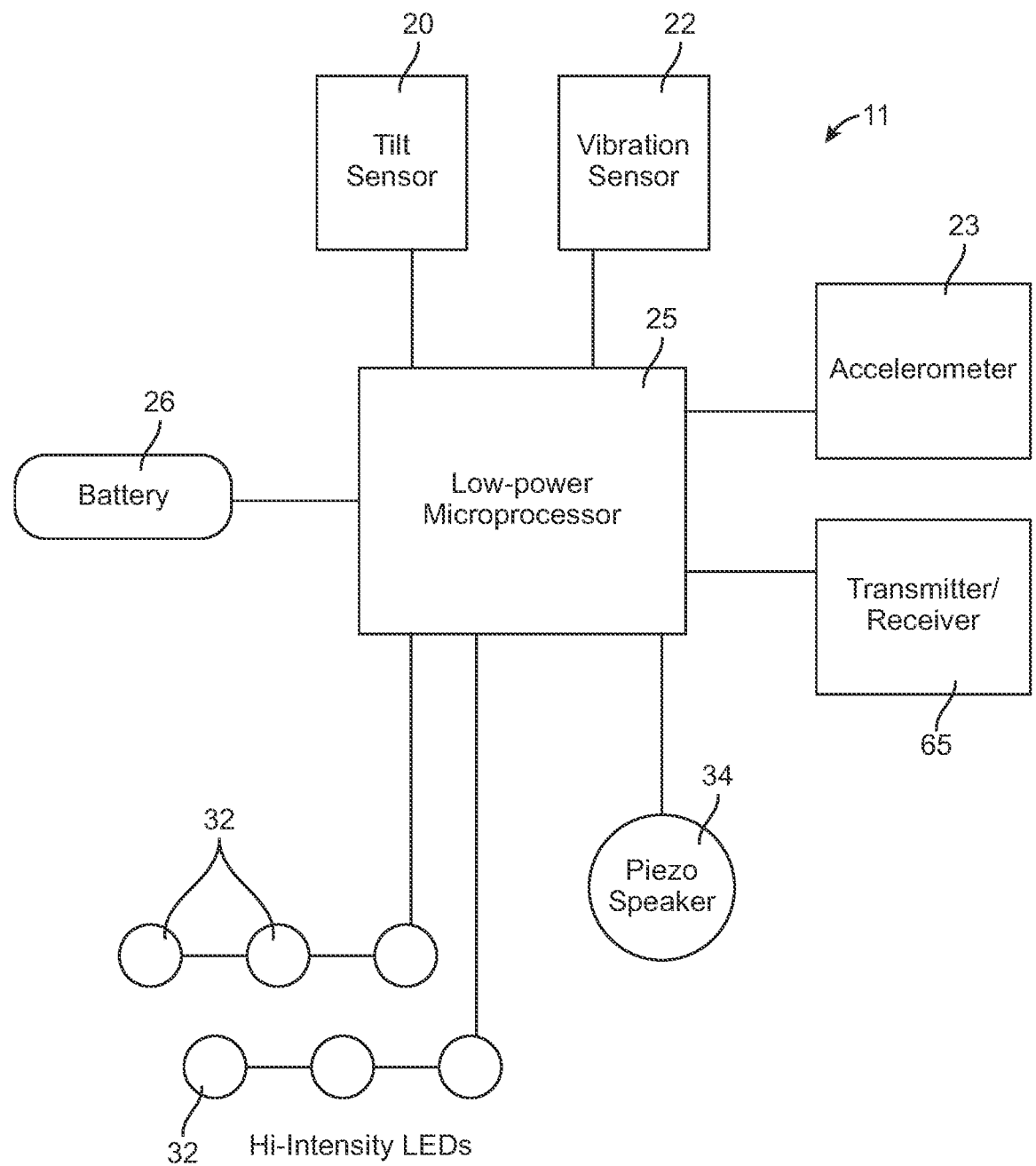
FIG. 5 is a schematic showing the connections between the various physical components of the present warning system.
Figure 6:
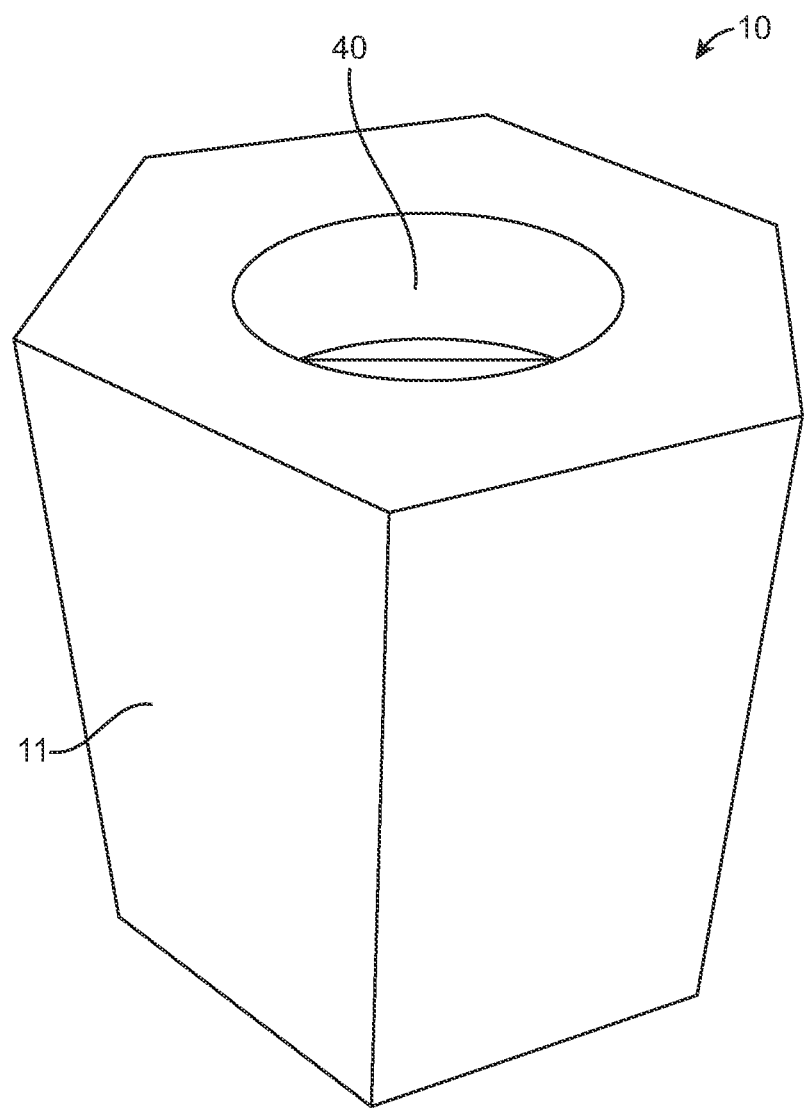
FIG. 6 is an assembled perspective view of an embodiment of the present system.
Figure 7:
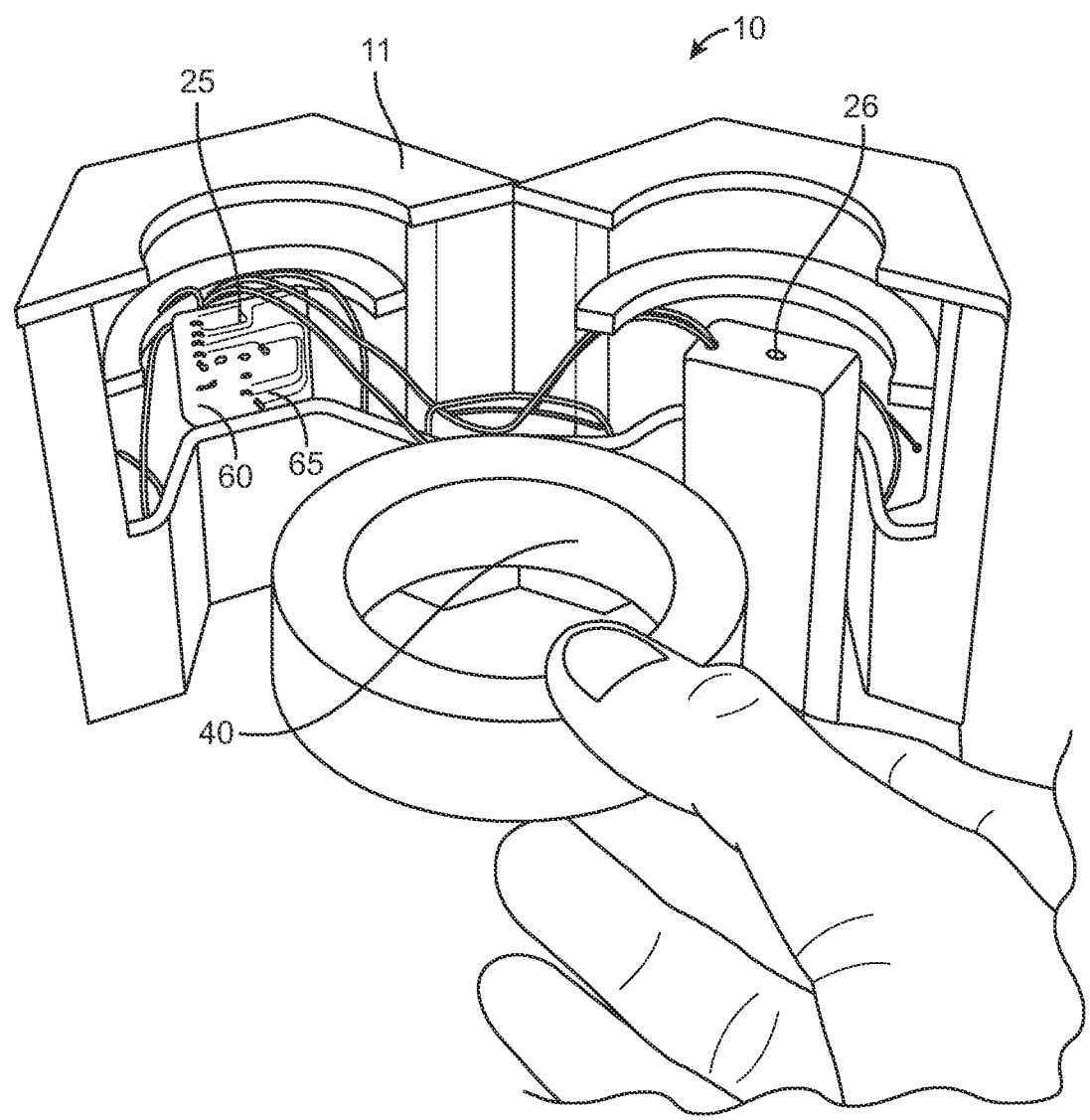
FIG. 7 is an exploded perspective view of the embodiment of FIG. 6.

As illustrated in FIGS. 1, 2 and 3, the present system preferably provides monitoring system 10 for a fuel line. System 10 preferably comprises: a housing 11 dimensioned to be mounted at a distal end of a fuel line 50. As seen in FIGS. 5, 6 and 7, system 10 further comprises a tilt sensor 20 in housing 11; a vibration sensor in housing 11; and a microcontroller 25 in housing 11. In alternate embodiments, the tilt sensing and vibration sensing functions can instead be handled together by accelerometer 23, as such, any combination of tilt sensor 20, vibration sensor 22 and accelerometer 23 are to be included within the scope of the present system. Tilt sensor 20 can be any form of mechanical or electrical tilt sensing mechanism.

In preferred embodiments, the fuel line 50 is a gasoline pump fuel line. However, it is to be understood that the present system can be used with any suitable fuel line system, all keeping within the scope of the present system.

In preferred aspects, microcontroller 25 is configured to: (a) receive data from the tilt sensing mechanism 20 to detect tilting of the housing, and (b) receive data from the vibration sensing mechanism 22 to detect vibration of the housing. As seen best in FIG. 5, an alert system 30 can also be included. Preferably, alert system 30 includes at least one warning light 32 or at least one speaker 34 mounted on the housing. A power supply 26 is also preferably included within housing 11. Power supply 26 can optionally be a battery, or it may comprise a motion-activated power system which generates power when housing 11 is moved back and forth to the pump by different drivers (similar to the mechanisms found in a self-winding watch). Power supply 26 powers microcontroller 25 and alert system 30. Power supply can optionally also power tilt sensor 20 (should tile sensor 20 require power to operate) and vibration sensor 22.

In preferred aspects, alert system 30 is activated by microcontroller 25 when the microcontroller has determined that housing 11 has been tilted by a predetermined angle, for example more than 30 degrees, or more preferably, about 40 degrees. (It is to be understood that the present tilt sensor system encompasses any system of tilt measurement including mechanical and electrical systems, and is not limited to the particular angles described above). This is particularly helpful when the fuel nozzle 12 has been removed from the pump cradle 14 (i.e.: removed from its position in FIG. 1), and inserted into the vehicle's gas tank (i.e.: moved into the position in FIGS. 2 and 3). Specifically, right at or after the moment the driver starts re-fueling their vehicle, the present system can flash its lights 32 or emit an audible chirp through its speakers 34 (or both).

Later, when re-fueling has completed, the present vibration sensor 22 will detect the shake of the nozzle 12 and fuel line 50 when the pump automatically stops pumping. At this time, the alert system 30 can be activated by microcontroller 25. In optional embodiments, however, a delay time can be provided such that alert system 30 will only be activated after a specific period of time after the pump has shut off, and provided that the nozzle still has not been tilted back to its initial position (i.e.: the nozzle 12 has not been tilted from the re-fueling position in FIG. 2 back into the original upright position seen in FIG. 1). As such, alert system 30 can preferably be activated by microprocessor 25 when microcontroller 25 has determined that housing 11 has been tilted by a predetermined angle for a predetermined period of time after vibration sensing mechanism 22 has detected vibration of the housing (which is caused by the automatic shut off of the fuel vibrating nozzle 14). In various preferred embodiments, the predetermined period of time is from 10 to 20 seconds, and more preferably about 15 seconds. It is to be understood, however, that other times may be used instead per desired user requirements. Moreover, it is to be understood that the operation of alert system 35 can also be triggered immediately after vibration sensing mechanism 22 has detected vibration of the housing.

In further preferred aspects, it is desirable to have the alert system sound or flash (or both) intermittently when re-fueling has stopped and the fuel nozzle 12 still hasn't been returned to the gas pump cradle 14. In fact, an intermittent reminder may be preferred as it is both more "attention getting" and generally less annoying than a continuous light or sound. Moreover, in instances where the driver has left the pump area (for example, has wandered into the gas station store to make a purchase), it is not desirable to have the present warning system otherwise aggravating other gas station customers. As such, yet another preferred aspect of the present system is activating alert system 30 at predetermined intervals of time when microcontroller 25 has determined that housing 11 has not been tilted after a predetermined period of time after vibration sensor 22 has detected vibration of housing 11.

Figure 8:
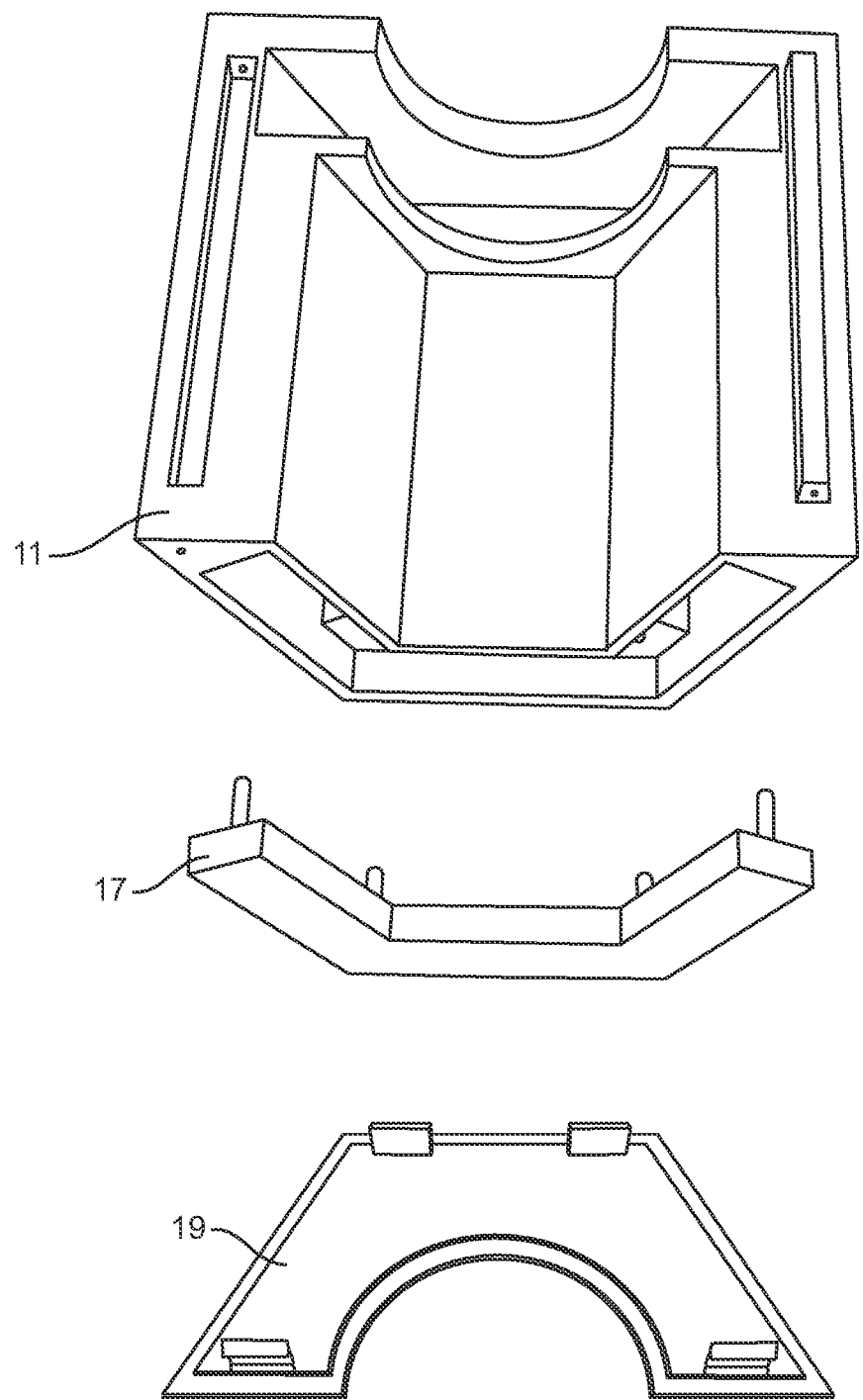
FIG. 8 is an exploded perspective view of one side of the present system with electrical components removed, and adding a bottom support.

As seen in FIGS. 1 to 3, housing 11 is dimensioned to be mounted adjacent to fuel nozzle 12, and most preferably right at the area of the fuel nozzle swivel. As seen best in FIGS. 6 and 7, housing 11 can be generally cylindrical and is dimensioned to be received around fuel hose 50. In preferred aspects, an optional mounting element 40 may be disposed within housing 11. Mounting element 40 wraps around fuel line 50 passing through housing 11. Most preferably, mounting element 40 is one of a plurality of interchangeable mounting elements that are receivable within housing 11, and all of the differently sized mounting elements have different internal diameters to wrap around a fuel lines of different diameters. Mounting element 40, and an optional bottom sealing support element assembly (seal 17 and bottom locking cap 19 in FIG. 8) are used together to isolates power supply 26 from ambient air around the housing. This has the safety advantage of sealing housing 11 such that a spark could not reach the ambient air around the distal end of the fuel line.

In further optional embodiments, system 10 also comprises a data recording system 60. Optionally, data recording system 60 may be disposed in microprocessor 25, or it may be a separate physical component in housing 11. Data recording system 60 logs information from tilt sensor 20 to record the number of times (and durations of time) that housing 11 has been tilted (FIGS. 2 and 3) and then returned to its original position (FIG. 1). Preferably as well, system 10 also comprises a data transmission system 65 for transmitting the information logged by data recording system 60. Preferably, this data transmission is made wirelessly to a remote system or computer or to the gas station operator. The advantage of having these optional data recording and transmitting components 60 and 65 is that the information they collect will track the uses of the fuel lines on the gas pump. To date, gas stations track usage at the pump level, but they are not able to track movements of the pump nozzles (including how often they are moved, and for how long). In addition, for older gas pumps that have three gas nozzles (i.e.: one for each octane blend), it is not possible to track the individual movement of the three gas nozzles, and thereby track usage at the individual fuel line level. The present system solves that dilemma. This logged and transmitted information may be useful in predicting future pump or fuel line maintenance or repair. In optional aspects, components 60 and 65 are also powered by power supply 26.

In further optional aspects, power supply 26 is a battery and data recording system 60 also logs the amount of power in the battery. This battery information can be especially helpful to ensure that the battery is changed before its power rubs out. In fact, different batteries can be used in different situations. For example, a stronger and longer-lasting battery may be used when the present system is connected to a low octane (i.e.: 87 blend gasoline) fuel line which is used most frequently, whereas a smaller battery power source may be used in the pump's diesel fuel line (which is used less frequently). In optional aspects, the data recording system 60 may even log battery use such that the optimally sized battery may be used for each system 10 (especially when it comes time for battery replacement).

In summary, in one preferred aspect, the present system provides a monitoring system 10 for a fuel line, comprising: a housing 11 dimensioned to be mounted at a distal end of a fuel line 50; a tilt sensing mechanism 20 (or accelerometer 23) in housing 11; and a microcontroller 25 in housing 11, wherein the microcontroller is configured to receive data from tilt sensor 25 to detect tilting of housing 11; a data recording system 60 in microprocessor 25, wherein the data recording system 60 logs information from tilt sensor 22 to record the number of times (and duration of these times) that the housing has been tilted (e.g.: to start refueling as in FIGS. 2 and 3) and then returned to an original position (as seen in FIG. 1); a data transmission system 65 for transmitting the information logged by the data recording system 60; and a power supply 26 in housing 11 for powering microcontroller 25 (and optionally tilt sensor 22 or accelerometer 23).

The present system also provides a method of warning that a fuel line nozzle 12 should be removed from a gas tank, comprising: determining that fuel pump nozzle 12 has been tilted from a first position (FIG. 1) to a second position (FIGS. 2 and 3); determining that fueling through fuel line 50 has stopped by detecting vibration of fuel pump nozzle 12; waiting for a predetermined period of time; and then activating an alert system 60 if fuel pump nozzle 12 has not tilted from the second position (FIGS. 2 and 3) back to the first position (FIG. 1). Preferably, this determining that fuel pump nozzle 12 has been tilted from a first position to a second position comprises: attaching a housing 11 at a distal end of a fuel line 30, housing 11 having a tilt sensing mechanism 20 and a vibration sending mechanism 22 (and/or accelerometer 23) therein; and detecting that housing 11 has been tilted with tilt sending mechanism 20, and detecting that housing 11 has vibrated with vibration sensing mechanism 22. Preferably, activating alert system 60 comprises activating at least one warning light 62 or at least one speaker 65 mounted on housing 11. Preferably, alert system 60 is activated when housing 11 has been tilted by a predetermined angle for a predetermined period of time after vibration of the housing has been detected. The alert system 60 can be repeatedly activated at predetermined intervals of time when housing 11 has not been tilted back from the second position (FIGS. 2 and 3) to the first position (FIG. 1) after a predetermined period of time after the vibration of housing 11 has been detected.

The present system also provides a method of recording fuel line usage, comprising: (a) mounting a monitoring system 10 at a distal end of a fuel line 30, the monitoring system 10 comprising: housing 11; tilt sensing mechanism 20; and microcontroller 25, wherein microcontroller 25 is configured to receive data from tilt sensing mechanism 20 to detect tilting of the housing; and a power supply 26 for powering the tilt sensing mechanism 20 and the microcontroller 25; a data recording system 60 (preferably integrated into microcontroller 25), wherein the data recording system 60 logs information from tilt sensing mechanism 20 to record the number of times that housing 11 has been tilted and then returned to its original position (FIG. 1); and a data transmission system 65 for transmitting the information logged by data recording system 60; (b) repeatedly tilting housing 11 from a first position to a second position and then back into the first position; (c) logging the number of times that housing 11 has been tilted from the first position to the second position and then back into the first position; and then (d) wirelessly transmitting the logged tilt data to a remote computer.

FIG. 5 illustrates a preferred sequence of method steps as follows. At step 100, the nozzle 12 is sitting in cradle 15 (as seen in FIG. 1). Next, at 102, the tilt sensor 20 detects a tilt of sufficient magnitude to indicate that the nozzle 14 has been moved to the re-fueling position of FIGS. 2 and 3. At this time, or shortly thereafter at stop 104, lights 32 flash and speaker 34 chirps. The customer starts re-fueling their car. At repeating steps 106 and 108, the microprocessor 25 monitors tilt sensing mechanism 20 and vibration sensing mechanism 22. This can be done every 15 seconds (step 106), or any other convenient interval of time. Finally, at step 110, vibration sensing mechanism 22 will either detect (or not detect) vibration. If vibration is detected, lights 32 can be flashed and speaker 34 can emit a chirp. This alert signals to the driver that re-fueling has been completed at step 112 and that they should now take nozzle 14 out of the car. Optionally, at step 114, the alert of step 112 can be made only intermittently (since a periodic chirp and flash is more attention getting than steady lights and sound, and will also save battery life). Finally, at step 116, lights 32 can be flashed and speaker 34 can emit a chirp at longer intervals of time if the tilt sensing mechanism 20 has not detected the nozzle 12 being returned to its cradle 14. The advantage of this approach is that it allows the driver to walk into the gas station and make a purchase without a continual alarm and flashing lights going off at their pump outside.

What is claimed is:

1. A monitoring system for a fuel line, comprising:
    a housing dimensioned to be mounted at a distal end of a fuel line;
    a tilt sensing mechanism in the housing;
    a vibration sensing mechanism in the housing;
    a microcontroller in the housing, wherein the microcontroller is configured to:
        (a) receive data from the tilt sensing mechanism to detect tilting of the housing, and
        (b) receive data from the vibration sensing mechanism to detect vibration of the housing;
    an alert system comprising at least one warning light or at least one speaker mounted on the housing; and
    a power supply in the housing for powering the microcontroller and the alert system, and
    wherein the alert system is activated by the microcontroller when the microcontroller has determined that the housing has been tilted by a predetermined angle for a predetermined period of time after the vibration sensing mechanism has detected vibration of the housing.

2. The monitoring system of claim 1, wherein the predetermined angle is 40 degrees.

3. The monitoring system of claim 1, wherein the predetermined period of time is from 10 to 20 seconds.

4. The monitoring system of claim 1, wherein the alert system is repeatedly activated at predetermined intervals of time when the microcontroller has determined that the housing has not been tilted after a predetermined period of time after the vibration sensing mechanism has detected vibration of the housing.

5. The monitoring system of claim 1, wherein the housing is dimensioned to be mounted adjacent to a fuel nozzle.

6. The monitoring system of claim 5, wherein the housing is generally cylindrical and is dimensioned to be received around a fuel hose.

7. The monitoring system of claim 6, further comprising:
    a mounting element disposed within the housing, wherein the mounting element wraps around a fuel line passing through the housing.

8. The monitoring system of claim 1, wherein the housing further comprises at least one sealing element that isolates the power supply from ambient air around the housing.

9. The monitoring system of claim 1, further comprising:
    a data recording system in the microprocessor, wherein the data recording system logs information from the tilt sensing mechanism to record the number of times that the housing has been tilted and then returned to an original position; and
    a data transmission system for transmitting the information logged by the data recording system.

10. The monitoring system of claim 9, wherein the power supply is a battery, and wherein the data recording system logs the amount of power in the battery.

11. The monitoring system of claim 10, further comprising:
    a data recording system in the microprocessor, wherein the data recording system logs information from the tilt sensing mechanism to record the number of times that the housing has been tilted and then returned to an original position; and
    a data transmission system for transmitting the information logged by the data recording system.

* * * * *